United States Patent
Hansen

[11] Patent Number: 5,560,212
[45] Date of Patent: Oct. 1, 1996

[54] VEHICLE AIR CONDITIONING SYSTEM USING LIQUID GAS

[76] Inventor: William L. Hansen, P.O. Box J, Superior, Ariz. 85273

[21] Appl. No.: 494,684

[22] Filed: Jun. 26, 1995

[51] Int. Cl.$^6$ .............................. F25B 19/00; F25B 27/00
[52] U.S. Cl. .................................................. 62/7; 62/238.1
[58] Field of Search ........................ 62/7, 79, 99, 238.1, 62/239, 244

[56] References Cited

U.S. PATENT DOCUMENTS

| | | | |
|---|---|---|---|
| 2,183,452 | 12/1939 | Gibbs et al. | 62/7 |
| 2,224,740 | 12/1940 | Melcher | 62/7 |
| 2,227,927 | 1/1941 | Downs | 62/7 |
| 2,753,856 | 7/1956 | Rush | 62/7 |
| 3,021,681 | 2/1962 | Perry | 62/238.1 |
| 5,314,007 | 5/1994 | Christenson | 165/43 |

FOREIGN PATENT DOCUMENTS 2158183  5/1973  Germany.

3146870  6/1983  U.S.S.R. ........................................ 62/7

Primary Examiner—William Doerrler
Attorney, Agent, or Firm—Warren F. B. Lindsley

[57] ABSTRACT

An air conditioning system is disclosed for cooling a cabin of a vehicle. The vehicle has combustion chambers and a cooling system which circulates vehicle coolant. The cooling system also includes a radiator and an intake manifold. The air conditioning system includes a source of a liquid gas which is connected to the combustion chambers with a first heat exchanger positioned between the source and the combustion chambers. A coolant line also extends through the first heat exchanger whereby a coolant passing therethrough is cooled via vaporization of the liquid fuel. A pump is connected to the coolant line and circulates the coolant through the air conditioning system. The coolant line is also connected to a second heat exchanger whereby coolant passing through the second heat exchanger is heated and thereby cools the air. The now heated coolant circulates back to the first heat exchanger.

4 Claims, 2 Drawing Sheets

VEHICLE AIR CONDITIONING SYSTEM USING LIQUID GAS

BACKGROUND OF THE INVENTION

This invention relates to a vehicle air conditioner using liquid gas fuels to provide cooling, and, more particularly, to one which utilizes the vaporization of said liquid fuels to provide cooling to the cabin of the vehicle.

At present, use of an air conditioner to cool the cabin of the vehicle requires a substantial penalty in gas mileage and engine efficiency.

In addition, internal combustion engines are known to generate pollutants because of the incomplete burning of hydrocarbon fuels for power. A number of attempts have been made to increase the efficiency of the combustion of hydrocarbon fuel through the use of butane, propane, natural gas or hydrogen either as a fuel or in combination with gasoline.

While such materials are gaseous at room temperature and atmospheric pressure, for efficient storage such materials are generally provided in pressurized tanks in a liquid form. Prior to introduction into the combustion chamber, these materials are transitioned from the liquid state to the gaseous state. The liquid to gas transition absorbs a great quantity of heat which the present invention utilizes to provide cooling for the vehicle cabin.

DESCRIPTION OF THE PRIOR ART

U.S. Pat. No. 5,314,007 discloses an air cooler for liquid petroleum gas (LPG) vehicles comprising the combination of a convertor in which the LPG is changed in phase from liquid to gas by adding heat from a fluid, a dual three way valve, an air fluid heat exchanger in a compartment and a fluid circulation system independent of the internal combustion engine cooling system. The dual three way valve either directs engine coolant tapped from the engine through a converter and air fluid heat exchanger, or directs fluid from the independent fluid circulation system through the converter and air fluid heat exchanger.

West German patent 2 158 183 discloses a cooling device for vehicles with a heat insulated container for a cold condensed gas which is transitioned into the gaseous state in a preheat exchanger and used as fuel. The device includes an air cooler from which air is conveyed to the vehicle's interior. A heat carrier flows through both the preheat exchanger and the air cooler.

The known prior art is described above. None of the known prior art disclose the device set forth herein.

SUMMARY OF THE INVENTION

In accordance with the invention claimed, one object of this invention is to provide an improved air conditioning system for vehicles.

It is another object of this invention to improve the efficiency of vehicle air conditioning systems by utilizing the heat absorbed by the transition of a condensed gas from a liquid to gaseous state.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawings, in which.

DESCRIPTION OF THE PREFERRED EMBODIMENT

Figure 1:
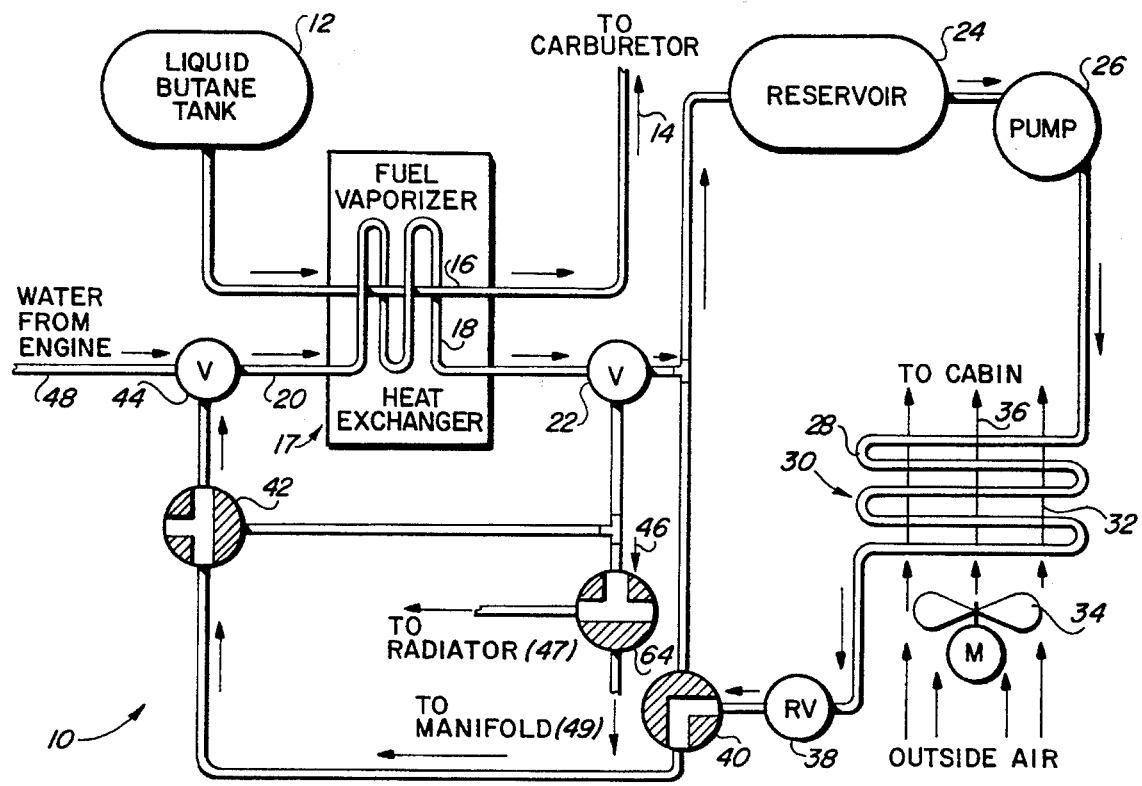
FIG. 1 is a schematic view of one embodiment of the present invention.
Figure 2:
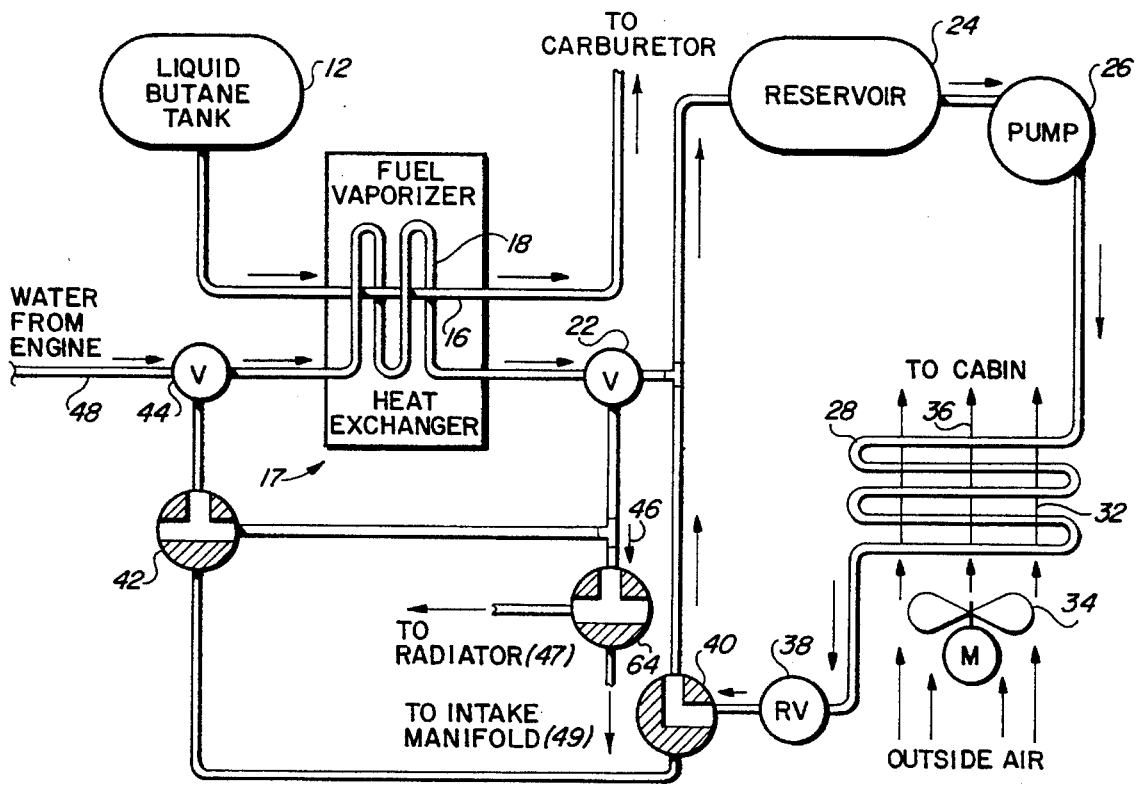
FIG. 2 is a schematic view of the embodiment of FIG. 1 in a de-icing mode.
Figure 3:
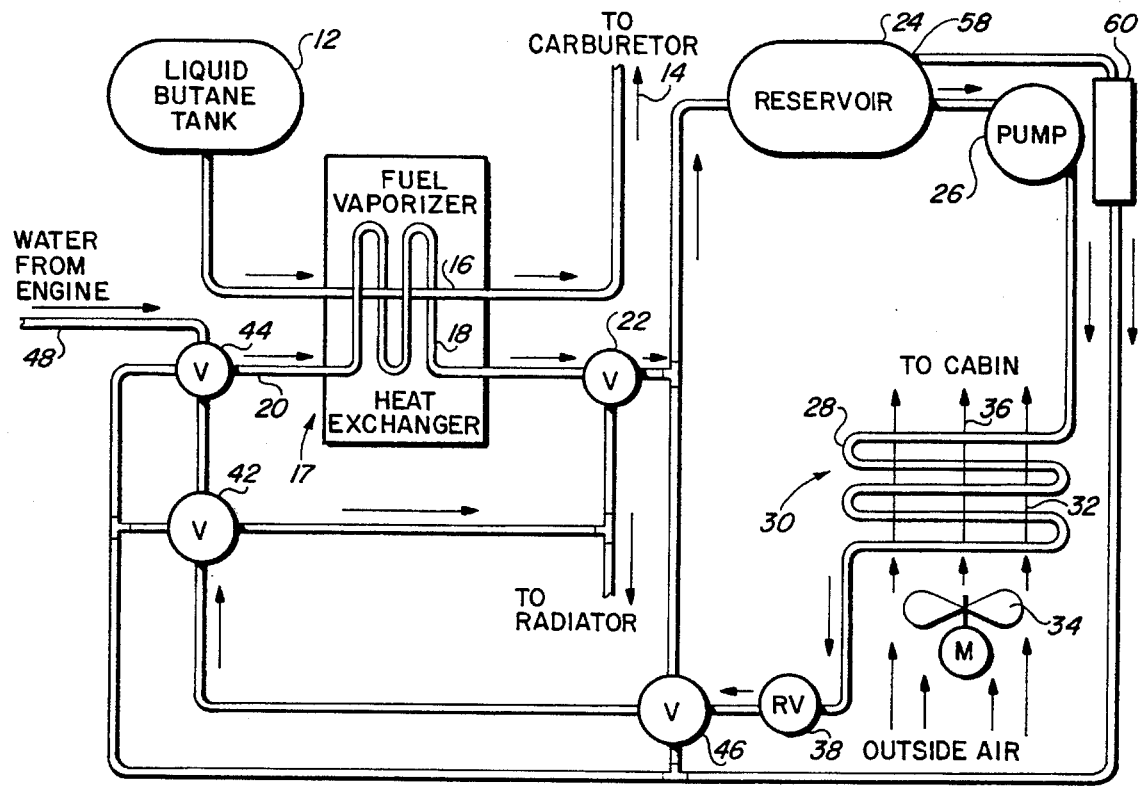
FIG. 3 is a schematic view of an alternate embodiment of the present invention.

In accordance with the invention claimed, FIGS. 1–3 disclose an air conditioning system 10 for use with vehicles. Vehicles typically include a cooling system having a radiator 46, an intake manifold 48 and a vehicle coolant circulating therein.

As seen in FIG. 1, one embodiment of the invention includes a liquid gas (butane, propane, hydrogen etc.) tank 12 which is connected to combustion chambers 14 of the vehicle via a carburetor or fuel injection system or the like. A fuel vaporizer 16 comprising one side of heat exchanger 17 is positioned between combustion chambers 14 and tank 12.

The other side 18 of heat exchanger 17 interacts with a coolant passing through a coolant line 20 thereby exchanging heat with fuel vaporizer 16. The vaporizing fuel absorbs heat from the coolant thereby reducing the coolant temperature. In turn, the coolant surrenders its heat to fuel vaporizer 16 to assist in vaporizing the liquid gas.

The coolant can be any suitable composition such as ethylene glycol/water mixtures or even water alone. Other suitable compositions or materials will be apparent to those skilled in the art.

The coolant, now reduced in temperature, is input by piping to valve 22 directing the coolant to a reservoir 24, a pump 26 and one side 28 of a second heat exchanger 30. Pump 26 provides the needed impetus to keep the coolant circulating while reservoir 24 provides a source of coolant. As discussed below, valve 22 may also direct the coolant input to the radiator 46.

Figure 4:
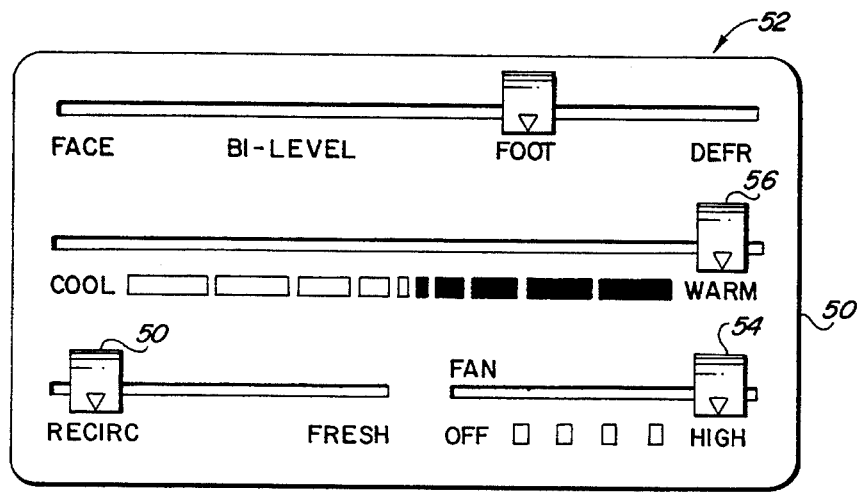
FIG. 4 is a front view of a typical air conditioning control panel in a vehicle.

Air is directed from fan 34 through the other side 32 of second heat exchanger 30. The air can be outside air, air from the vehicle cabin or a mixture thereof as selected by the occupants of the cabin using the air intake control 50 found on a control panel 52 such as the one illustrated in FIG. 4. Further, the fan speed can be varied using a fan speed control 54 as shown in FIG. 4. Such control methods are well known in the art and will not be further described herein.

Air directed as described loses temperature during passage through heat exchanger 30. That cooling will also reduce the humidity of the air by condensing moisture therefrom. The conditioned air is directed into the cabin 36 of the vehicle, thereby providing air conditioning for the occupants. In turn, the air heats coolant which is directed via valves 38, 40, 42 and 44 to heat exchanger 17 and fuel vaporizer 16.

Valve 38 is preferably a restriction or limiting valve which controls the flow of coolant through heat exchanger 30 and is used to control the cooling of cabin 36. Reducing the coolant flow through valve 38 increases the cooling effect while increasing the coolant flow decreases the coolant effect. Preferably, valve 38 is controlled by a temperature control 56 mounted on the control panel 52 seen in FIG. 4. Such control methods are well known in the art.

Valve 40, as discussed in greater detail below in connection with FIG. 2, may also direct the input from valve 38 directly to reservoir 24. Valve 42, as discussed below in connection with FIG. 3, may also direct the input from valve 40 to radiator 46. Valve 44 takes either the coolant from valve 42 for maximum temperature reduction on the coolant or takes the vehicle coolant from the intake manifold 48 and routes to heat exchanger 17.

The present system includes a deicing cycle which can be initiated when the coolant temperature is too low. As best seen in FIG. 2, the coolant is diverted by valves 22 and 40 to circulate only through reservoir 24, pump 26, heat exchanger 30, restriction valve 38 and valve 40. In the preferred embodiment, the valves 22 and 40 include cold water thermostats which divert when the coolant temperature is too low.

As an alternate embodiment seen in FIG. 3, such temperature sensing and control could be performed by a sensor 58 and controller 60 which are well known in the art. Sensor 58 is mounted within reservoir 24, however, such sensors could be mounted at other positions in the coolant line as those skilled in the art will recognize.

By bypassing heat exchanger 17, the coolant no longer is cooled by fuel vaporizer 16, and, in fact, heat is added to the coolant via the heat exchanger 30. The de-icing cycle continues until the thermostat senses the desired temperature.

In addition, in this configuration, pump 26 can be shut off entirely if air conditioning is not desired for cabin 36.

During the de-icing cycle, valve 44 opens to direct coolant from a manifold 48 of the vehicle's engine to the line 20 passing through heat exchanger 17 and fuel vaporizer 16. The coolant is subsequently returned to the vehicle's radiator 46 via valve 22. The use of the vehicle's coolant provides heat to assist in the vaporization of the liquid fuel. In this configuration, if valve 64 diverts the coolant directly to intake manifold 48, the cooling effect on the engine is maximized.

In a further embodiment of this invention shown in FIG. 3, system 10 is integrated with the vehicle's coolant system whereby coolant from intake manifold 48 is directed through heat exchanger 17, reservoir 24, pump 26, the second heat exchanger 30, valves 38, 40 and 42 to the radiator 47. In this embodiment, restriction valve 38 operates in the manner described in discussions relating to FIG. 1 and the de-icing cycle operates in the same manner as described in the discussions relating to FIG. 2.

In the embodiment of FIG. 3, valves 42 and 44 can be used to control the operating temperature of the vehicle's engine. When valve 42 directs the coolant to radiator 47, the engine's temperature can be reduced substantially. In one test, a 195 degree thermostat in a 396 cubic inch, 325 horsepower engine did not activate despite a 105 degree ambient temperature.

To provide de-icing capability for heat exchanger 17, a thermal switch 62 is in electrical communication with a de-icing valve 64. To achieve normal running temperatures, valve 64 is directed by either switch 62 or a manual switch (not shown) mounted within the cab to direct the coolant to radiator 46. To drop the coolant temperature, valve 64 directs coolant directly to intake manifold 48 or, alternatively, restriction valve 38 reduces the amount of coolant flowing through the system. Since the cooling effect of heat exhanger 17 is relatively constant, the reduction in coolant flow results in a significant drop in coolant temperature thereby increasing the coolant effect on cabin 36.

To heat the engine to reach and maintain optimum temperature, valve 42 bypasses the radiator and directs the coolant to heat exchanger 17 via valve 44. In turn, valve 44 isolates system 10 from the engine which essentially duplicates system 10 as described in the discussions relating to FIG. 1. Isolating system 10 from the engine eliminates any cooling effect on the engine.

Although only certain embodiments of the invention have been illustrated and described, it will be apparent to those skilled in the art that various changes and modifications may be made therein without departing from the spirit of the invention or from the scope of the appended claims.

That which is claimed is:

1. An air conditioning system for cooling a cabin of a vehicle, the vehicle having combustion chambers and a cooling system, the cooling system including a radiator and an intake manifold which circulate engine coolant, the air conditioning system comprising:

a source of a liquid gas connected to the combustion chambers via a fluid distribution device;

a first heat exchanger being positioned between the source and the combustion chambers;

a engine coolant line passing through the first heat exchanger whereby the vehicle engine coolant passing therethrough is cooled and thereby vaporizes the fuel;

a pump connected to the engine coolant line for circulating the coolant through the engine coolant system;

the engine coolant line being connected to a second heat exchanger having air passing through the second heat exchanger whereby the engine coolant is heated and the air is cooled therein, the cooled air being directed to the cabin, the heated engine coolant being recirculated to the first heat exchanger; and a reservoir mounted on the engine coolant line between the first heat exchanger and the second heat exchanger.

2. An air conditioning system for cooling a cabin of a vehicle, the vehicle having combustion chambers and a cooling system, the cooling system including a radiator and an intake manifold which circulate vehicle engine coolant, the air conditioning system comprising:

a source of a liquid gas connected to the combustion chambers via a fluid distribution device;

a first heat exchanger being positioned between the source and the combustion chambers;

a engine coolant line connected to the intake manifold of the vehicle engine cooling system passing through the first heat exchanger whereby the vehicle engine coolant passing therethrough is cooled and thereby vaporizes the fuel;

a pump connected to the coolant line for circulating the vehicle engine coolant through the system;

the coolant line being connected to a second heat exchanger having air passing through the second heat exchanger whereby the coolant is heated and the air is cooled, the cooled air being directed to the cabin, the heated coolant being returned to the radiator; and a deicing system, the deicing system comprising:

a first valve positioned between the first heat exchanger and the second heat exchanger, the first valve receiving the vehicle engine coolant from the first heat exchanger and diverting the vehicle engine coolant directly to the radiator when the coolant temperature falls below a preset temperature; and a second valve positioned between the second heat exchanger and the first heat exchanger, the second valve receiving the vehicle engine coolant from the second heat exchanger and diverting the vehicle engine coolant to bypass the first heat exchanger when the coolant temperature falls below a preset temperature.

3. The air conditioning system of claim 2 wherein the first valve and the second valve are cold water valves.

4. The air conditioning system of claim 2 further comprising a temperature sensor in contact with the coolant and a controller for diverting the coolant when the temperature falls below the preset temperature in electrical communication with the sensor and the first valve and the second valve.

* * * * *